Aug. 27, 1940.   F. R. HAHN   2,213,088
PRECISION GAUGE
Filed May 28, 1938   2 Sheets-Sheet 2
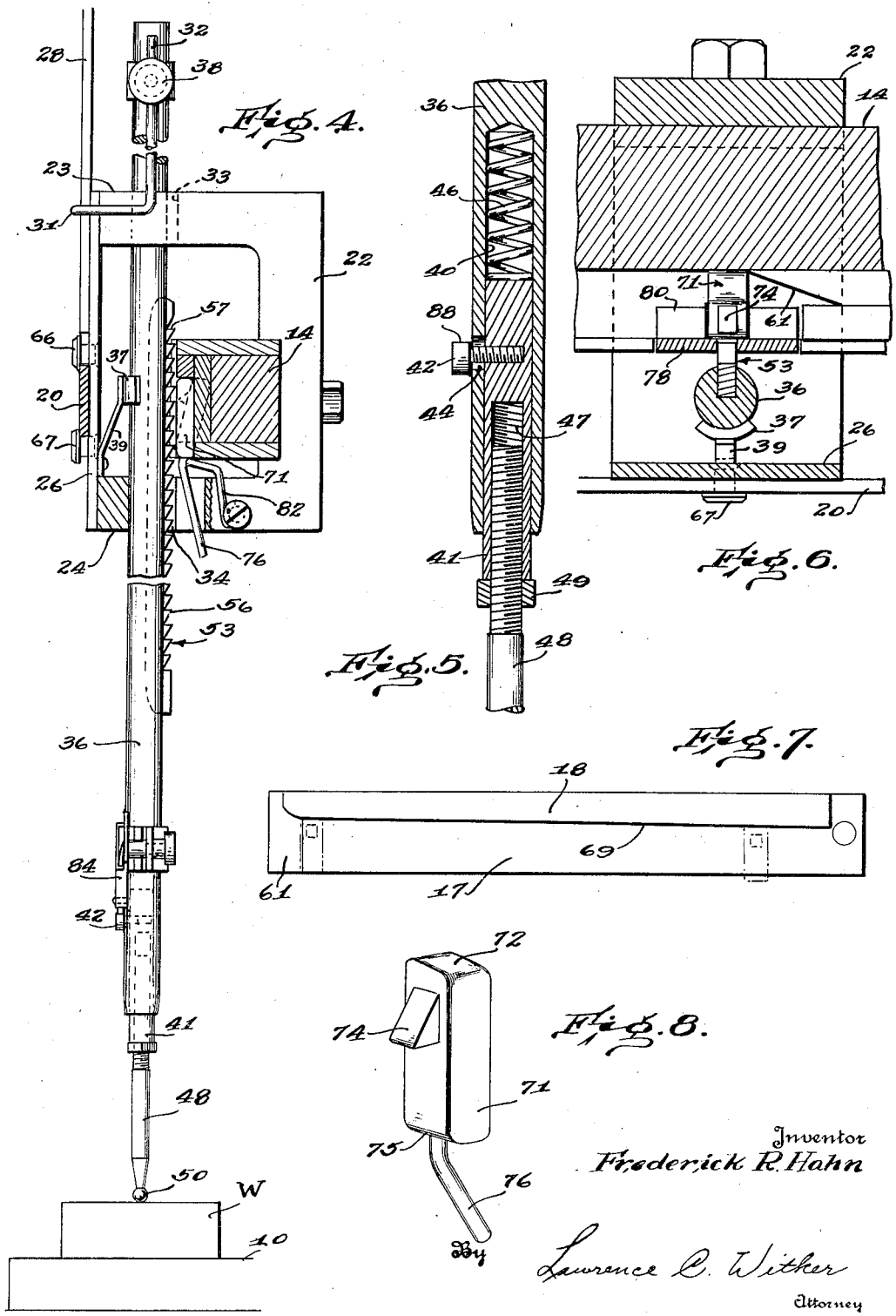

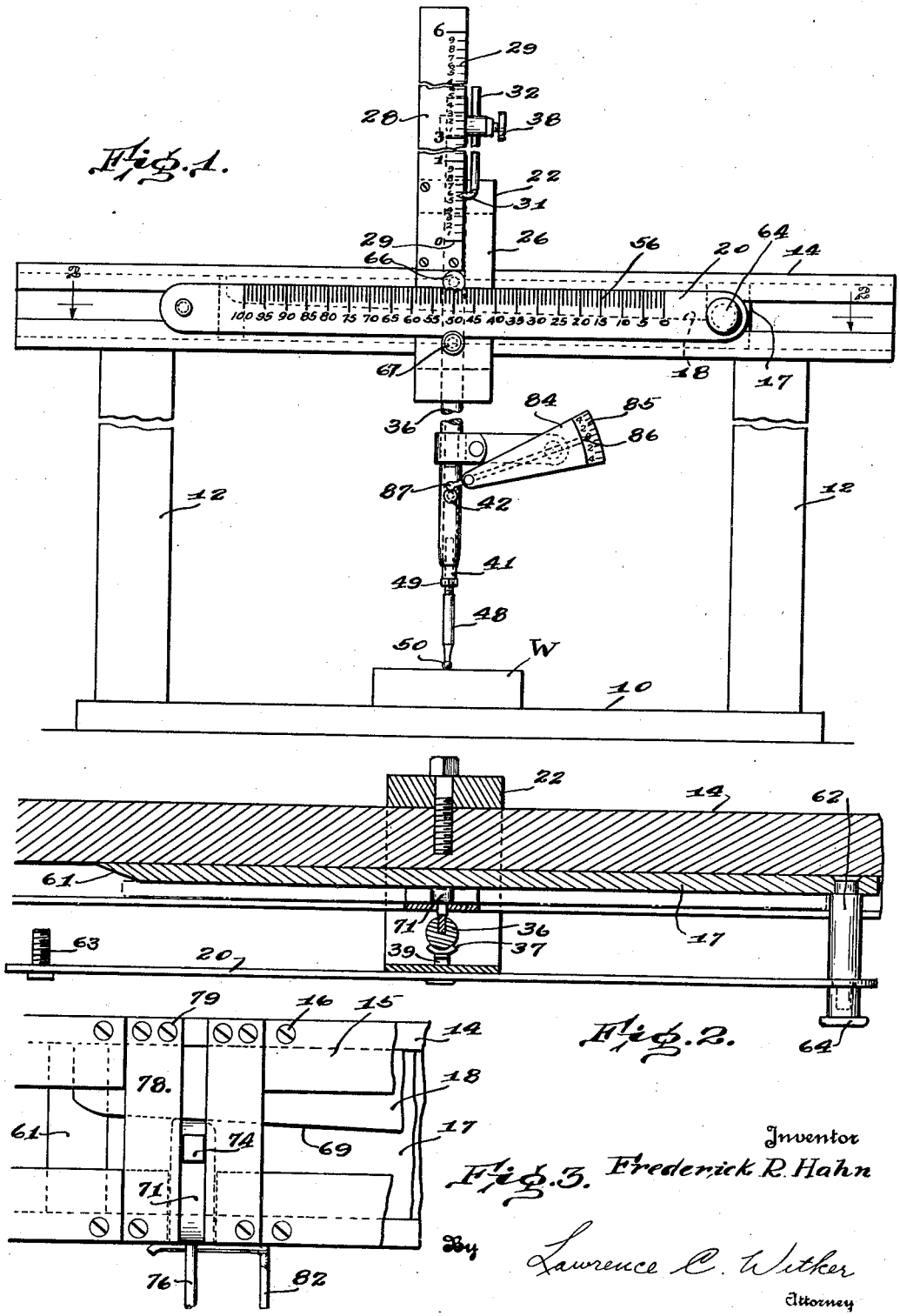

Patented Aug. 27, 1940

2,213,088

UNITED STATES PATENT OFFICE 2,213,088

PRECISION GAUGE

Frederick R. Hahn, Toledo, Ohio

Application May 28, 1938, Serial No. 210,618

7 Claims. (Cl. 33—147)

This invention relates to gauges and is more particularly directed to precision gauges for accurately and rapidly indicating measurements.

An object of the invention is to provide means for precisely indicating dimensions in decimal equivalents by direct reading.

Another object of the invention is to provide a work engaging member connected to means for indicating one-tenth inch measurements together with means coupled therewith for indicating one-thousandth inch measurements, the combined indications producing the total dimension.

A further object of the invention is to provide means to compensate for abutting engagement between a work engaging member and the work, and for indicating the correct engagement therebetween.

A still further object of the invention is to provide a device of this character having comparatively few moving parts subjected to wear and adjusting means to compensate for wear should any occur.

Further objects and advantages will become apparent as the description proceeds taken in connection with the accompanying drawings, in which:

Figure 1 is a front view of the gauge of the invention;

Figure 2 is a sectional view taken substantially on a line 2—2 of Figure 1;

Figure 3 is an enlarged fragmentary front view of the cam and pawl mechanism of the invention;

Figure 4 is a vertical sectional view through an intermediate portion of the device shown in Figure 1;

Figure 5 is a fragmentary vertical sectional view through the lower portion of the structure shown in Figure 4;

Figure 6 is an enlarged fragmentary detail view of the structure shown in Figure 2 with the cam means retracted;

Figure 7 is a front view of a slide and cam element of the invention; and

Figure 8 is a perspective view of the pawl element, forming a part of the invention.

Referring to the drawings and particularly Figure 1 thereof, 10 indicates an anvil or base having a surface upon which the work W to be measured is placed. Supported by anvil 10 in a convenient manner, rods 12 being shown for illustrative purposes only, is a generally horizontally disposed channel-shaped member 14 preferably arranged to present an open front as viewed in Figure 1. Member 14 is located at the desired distance above anvil 10 to accommodate work of various sizes, as will be understood. Inwardly extending flange members 15 are preferably secured to member 14 by screws 16, although the flanges may be integral with member 14 if desired, and serve as guide means for a movable slide member 17 spaced rearwardly thereof by means of a cam member 18 carried on the front face of the slide. Slide 17 supports a scale 20 movable therewith in a generally horizontal direction longitudinally of member 14.

Suitably secured to member 14 is a substantially C-shaped bearing bracket 22 having its arms 23 and 24 extending forwardly of member 14. Bridging the ends of arms 23 and 24 is a guide plate 26 to which is secured one end of a vertically disposed scale 28 graduated as at 29. The graduations are spaced one-tenth of an inch apart starting at 0 at the bottom of the scale. Although the scale shown is capable of indicating measurements up to six inches, it is to be understood that a scale of any suitable length is contemplated. Cooperating with scale 28 is a pointer or indicator 31 of a suitable type, a formed wire rod 32 of small diameter having been chosen for illustration. Pointer 31 is movable relative to the scale 28 for indicating measurements by means of the following mechanism.

Adjacent the free ends of arms 23 and 24 are vertically aligned openings 34 and 35 for slidably receiving a rod or bar 36. The upper end of bar 36 is provided with a screw clamp 38 which supports one end of the pointer rod 32. Bar 36 is capable of vertical movement with respect to its support and therefore movement of bar 36, pointer 31 is movable with respect to scale 28. The scale 28 and its cooperating pointer 31 serve as means for indicating an approximate or rough measurement of the work as will hereinafter appear. Bar 36 is freely movable manually, friction means being provided to resiliently retain the bar in adjusted position. Such means preferably comprises a block 37 having a surface conforming with and in sliding engagement with a portion of bar 36, and positioned with respect thereto by means of a resilient element such as a leaf spring 39 secured at one end to the block 37 and at its other end to the guide plate 26 in such a manner that tension is applied on the block to constantly urge the same into engagement with bar 36. It will be understood that any other suitable means may be employed to retain the bar 36 in adjusted position.

The lower end of bar 36 is provided with a longitudinal bore 40 for snugly receiving a pin or movable extension 41. The pin 41 carries a lateral stop 42 projecting through a solt 44 in the bar 36 and threaded into an opening in the pin 41. Interposed between the inner end of pin 41 and closed end of the bore 40 is a helical spring member 46 which tends to continuously urge the pin 41 downwardly, its movement being restricted within the upper and lower limits of slot 44 by reason of stop 42. Thus pin 41 is resiliently mounted in the bar 36, and is further provided with a threaded inner bore 47, to receive a suitably threaded tip or point member 48. Through the threaded connections, member 48 is adjustably mounted on the bar 36 and may be locked in adjusted position by means of a nut 49 threaded onto the member 48 as will be readily understood. The member 48 may be of any known type, the ball point 50 being shown for convenience. For example, the point 50 may be tapered to a sharp point or may be of any other configuration to adapt the same to the type of work being gauged.

Extending throughout a substantial portion of the length of bar 36 is a rack 53 which may either be integral with the bar 36 or a separate member suitably secured thereto as at 55. The teeth 56 preferably have upper surfaces 57 at right angles to the axis of the bar, such surfaces being accurately machined so that they are $\frac{1}{10}$ of an inch apart to correspond to the graduations on the vertical scale 28.

One end of slide 17, the left end as viewed in the drawings, is beveled at 61, while the other end is provided with a pin 62. Arranged parallel to the slide 17 and secured thereto by the pin 62 is the horizontal or vernier scale 20, graduated as at 56 from 0 to 100, the entire graduated portion representing $\frac{1}{10}$ of an inch, so that each graduation is equal to $\frac{1}{1000}$ of an inch. A manipulating button, or knob 64 is provided at the pin end of the scale 20 to enable the scale and thus the slide to be moved.

Projecting from the front of plate 26 are a pair of spaced guides 66 and 67, which engage the edges of scale 20 and between which the scale is slidable. A suitable stop is provided in the form of a screw 63 to limit movement of the scale to the right and thus prevent the same from becoming separated from the channel 14 during normal use. The stop 63 is removable however and the scale can be removed if so desired. One of the guides, preferably the upper guide 66 is in the form of a pointer or indicator to cooperate with the graduations on the scale 20 to give a reading on that scale.

Adjacent the top edge of the slide 17 and secured thereto in any suitable manner, is the cam member 18 provided with a tapered bottom surface 69, the amount of inclination between points opposite 0 and 100 on the scale 20, being equal to one-tenth of an inch to correspond to the graduations on the entire horizontal scale 20. The cam surface 69 engages the top of a floating pawl member 71, such as is shown in Figure 8. The pawl is of substantially rectangular form having a top surface 72 angularly disposed to correspond to the taper of cam surface 69. A tooth 74 is provided on the front face of the pawl which is engageable with the teeth 56 of rack 53 carried by the bar 36. The lower front edge of the pawl is arcuately formed as at 75 and an arm 76 is projected downwardly from the bottom surface.

Substantially centrally of the member 14 and bridging the front open face thereof are a pair of spaced guides 78 secured thereto by means such as screws 79. Pawl 71 is positioned rearwardly of the guides 78 which are spaced sufficiently to freely receive the tooth 74 for movement therebetween. Secured to the rear of guides 78 are a pair of blocks 80 engageable with the sides of the pawl 71. The otherwise freely floatable pawl is urged upwardly by means of a spring 82 secured at one end to bracket 22, the other end of spring 82 underlying the pawl and in pressing contact with the arm 76. Thus, spring also tends to rock the pawl rearwardly to urge tooth 74 out of engagement with the rack 53, as particularly noted in dotted lines in Figure 4.

Clamped or otherwise secured to the bar 36 is an indicator 84 of any suitable type; preferably having a scale 85 and pointer 86, the latter being operated by means of a pivoted link arm 87 resting upon a flat top surface 88 of the stop 42. Thus relative movement between point member 48 and bar 36 serves to actuate the pointer 86, as will be understood. It is to be further noted that the indicator 84 may be secured to any convenient place on the bar 36, so that it may be actuated upon movement of the stop 42. When pointer 86 is at zero or in the center of the scale 85, the tip 48 is in proper relation to the bar 36, and to adjust the tip 48, bar 36 is moved downwardly so that point 50 engages the work surface of anvil 10 and tip 48 is threaded into or out of the extension so that pointer 86 is at zero. When point 48 has been thus initially adjusted, the pointer 31 is set to read at zero on the vertical scale 28. Thereafter when the gauge is being used to measure the work, it will be clear that correct measurements can be made in the following manner.

Scale 20 and slide 17 are moved to the right by knob 64 until pointer 66 is out of register with the graduations 56. In this position slide 17 has been moved out of engagement with the rear of pawl 71, enabling spring 82 to rock pawl 71 so that the tooth 74 is out of engagement with the teeth 56 of rack 53, which permits the bar 36 to be freely moved vertically. When the bar 36 is in an upper position, the work may be positioned beneath the point 50 of the tip 48. The bar 36 may then be moved downwardly until the point 50 engages the work. In such a position, the pointer 31 which has been moved simultaneously with the bar 36 will be in register with a graduation 29 on the scale 28, which will indicate a reading which will closely approximate the dimension of the work. The slide 17 and scale 20 are then moved to the left, the taper 61 causing pawl 71 to rock forwardly so that the tooth 74 thereof engages the tooth on rack 53 corresponding to the graduation indicated by pointer 31. As pawl 71 is moved forwardly and the slide 17 engages the rear of the pawl, the high portion of the cam surface 69 rides over the top of the pawl and upon engagement therewith urges the pawl downwardly against the tension of spring 82. Downward movement of the pawl 71 moves the bar 36 due to engagement of tooth 74 with one of the teeth 56. Movement of the scale 20 to the left is continued until the needle 86 of indicator 84 is directly opposite 0, which is an indication that the correct reading on both scales is available. The vertical scale 28 is read first and the reading on the horizontal scale added to the first reading to give the total reading and thus the dimension of the work. For example, the work W is a piece of stock .550″ thick, and in the foregoing manner, rod 36 was moved downwardly into contact with the work, at which time the indicator 31 was substantially above the graduation 5 between 0 and 1. Then as the scale 20 was moved to the left, the vertical pointer was adjusted along with the bar 36 until the graduation 59 approached the indicator 66. Simultaneously, the needle 86 approached 0 on the scale 85 and the correct reading made available, namely .550".

From the foregoing, it will be clear that once the contact member 48 is adjusted with respect to the anvil 10, in which position of the bar 36, indicator 31 is opposite 0 on the vertical scale 28, the ensuing measurements of work will be accurate to one-thousandth of an inch. This is provided for in the comparatively long cam surface 69 which moves the pawl and thus bar 36 through a maximum of but one-tenth of an inch of downward movement in one thousandth of an inch graduations on the horizontal or vernier scale 20.

It will also be clear that due to the fact that pawl 71 engages the rack 53 in a positive manner there is no wear therebetween, the only wearing surface on the pawl being the top, cam engaging portion which is substantially negligible. Wear on the points 50 of contact members 48 is readily compensated for by readjustment of the members with respect to bar 36.

It will be apparent that various modifications may be made in the structure without departing from the spirit of the invention and that the invention comprehends all variations and equivalents thereof.

What I claim is:

1. In a gauge having a work support and a member movable relative to the support and carrying a work contact point, the combination of means to move the contact point into engagement with the work comprising a rack on the movable member, a bar movable transversely of said rack, a pawl adjacent said rack and a cam carried by said bar and engageable with said pawl for moving the latter into engagement with said rack and said pawl and member toward the work.

2. In a gauge having a member movable relative to the work and a contact point on the member, the combination of a support, means for moving the contact point into engagement with the work comprising a rack on the movable member, a bar carried by said support and movable transversely of said rack, a pawl adjacent said rack and adapted to be moved into engagement therewith, and cam means on said bar for moving said pawl into engagement with said rack and for moving said pawl and contact point toward the work.

3. In a gauge having a member movable relative to the work and a contact point on the member, the combination of a support, means for moving the contact point into engagement with the work comprising a rack on the movable member, a bar carried by said support and movable transversely of said rack, a pawl adjacent said rack and adapted to be moved into engagement therewith, cam means on said bar for moving said pawl into engagement with said rack and for moving said pawl and contact point toward the work, and indicating means fixed to said movable member and responsive to relative movement between said contact point and said movable member.

4. In a gauge having a work support and a member movable with respect to the support and carrying a work contact point, the combination of means to move the contact point into engagement with the work comprising a rack on the movable member, a pawl engageable with said rack, and cam means for moving said pawl into engagement with said rack and subsequently moving said pawl and member toward the work, and means associated with said cam means to produce a direct indication in response to the movement of said member.

5. In a gauge having a work support and a member movable with respect to the support and carrying a work contact point, the combination of means to move the contact point into engagement with the work comprising teeth on the movable member, a pawl engageable with said teeth, and cam means for moving said member through said pawl.

6. In a gauge having a member movable relative to the work and an adjustable contact point on the member, the combination of a support, and means for moving the contact point into engagement with the work comprising teeth on the movable member, a pawl movable into engagement with said teeth, means to move said pawl into engagement with said teeth, and means to move said pawl and contact point toward the work.

7. In a gauge having a member movable with respect to the work, an adjustable contact point on the member, a support for the movable member, and means for moving the contact point into engagement with the work comprising teeth on the movable member, pawl means engageable with said teeth, and means to move said pawl into engagement with said teeth and said pawl and contact point toward the work.

FREDERICK R. HAHN.